(12) United States Patent
Mattingly, Jr. et al.

(10) Patent No.: US 7,029,174 B1
(45) Date of Patent: Apr. 18, 2006

(54) LARGE PACKAGE X-RAY APPARATUS AND METHOD

(75) Inventors: Bernard I. Mattingly, Jr., Leonardtown, MD (US); Miguel A. DeLeon, Waldorf, MD (US); Charles D. Pipes, Jr., Hughesville, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 227 days.

(21) Appl. No.: 10/337,318

(22) Filed: Jan. 7, 2003

(51) Int. Cl.
G03B 42/04 (2006.01)

(52) U.S. Cl. ........................................ 378/174; 378/182
(58) Field of Classification Search ................ 378/167, 378/174, 184, 187, 188, 182
See application file for complete search history.

(56) References Cited

U.S. PATENT DOCUMENTS

| | | | | |
|---|---|---|---|---|
| 3,725,703 | A | * | 4/1973 | Bucky ......................... 378/174 |
| 4,020,346 | A | | 4/1977 | Dennis ....................... 250/358 |
| 4,430,568 | A | | 2/1984 | Yoshida et al. .......... 250/358.1 |
| 6,058,159 | A | | 5/2000 | Conway et al. ............... 378/68 |
| 6,273,606 | B1 | * | 8/2001 | Dewaele et al. ............ 378/174 |
| 6,744,062 | B1 | * | 6/2004 | Brahm et al. ............... 378/174 |
| 2002/0044630 | A1 | | 4/2002 | Minnigh et al. ............ 378/174 |

OTHER PUBLICATIONS

ETS Operators Guide and Catalogue for Big Picture X-Ray System.

* cited by examiner

*Primary Examiner*—Edward J. Glick
*Assistant Examiner*—Chih-Cheng Glen Kao
(74) *Attorney, Agent, or Firm*—Fredric J. Zimmerman

(57) ABSTRACT

A method and apparatus for holding multiple x-ray cassettes for imaging a target including multiple layers of x-ray cassettes wherein the x-ray cassettes in successive layers are positioned in partial overlapping relationship such that when the target and x-ray cassettes are exposed to x-rays, a continuous image of the target is obtained.

29 Claims, 6 Drawing Sheets

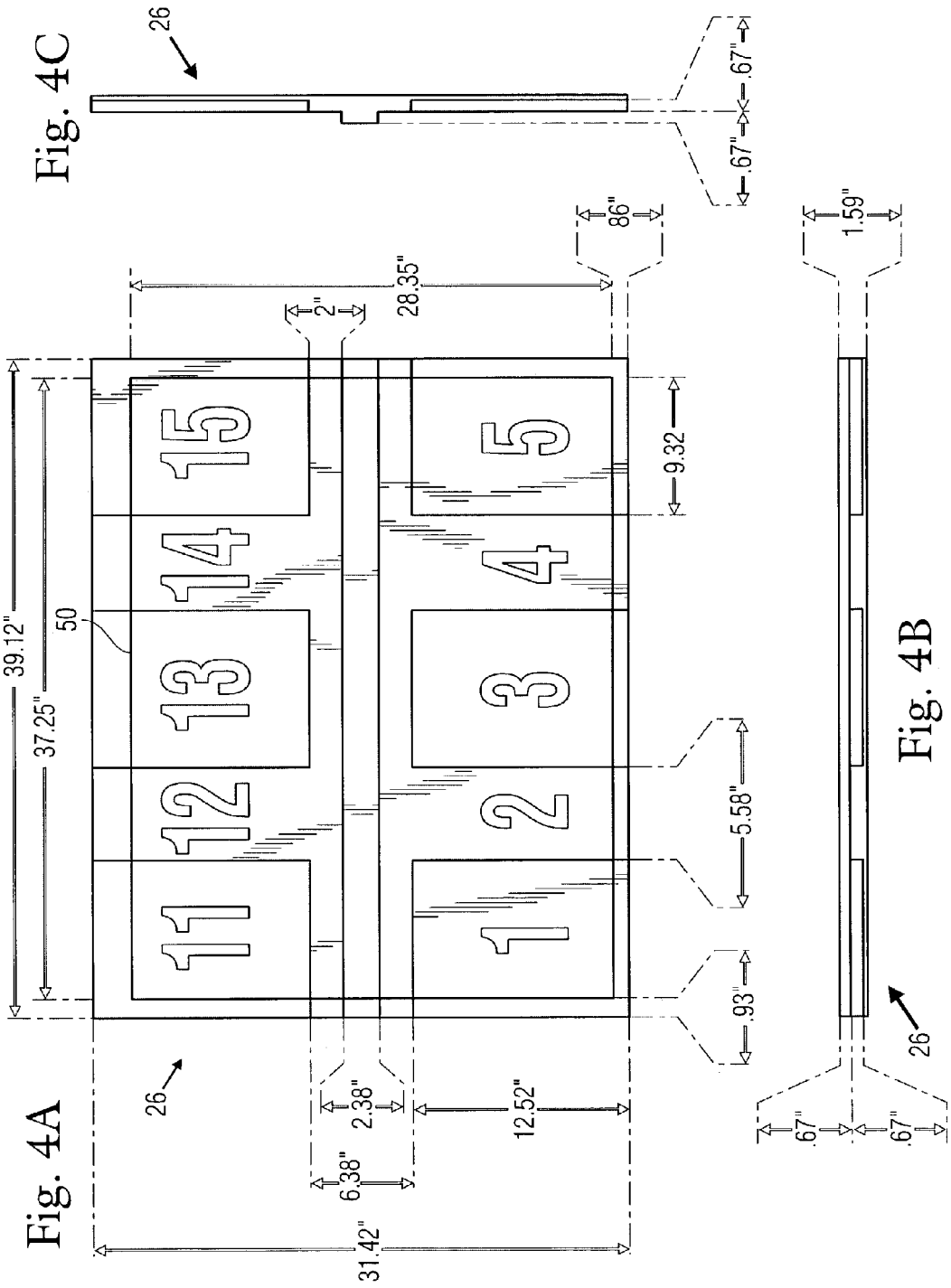

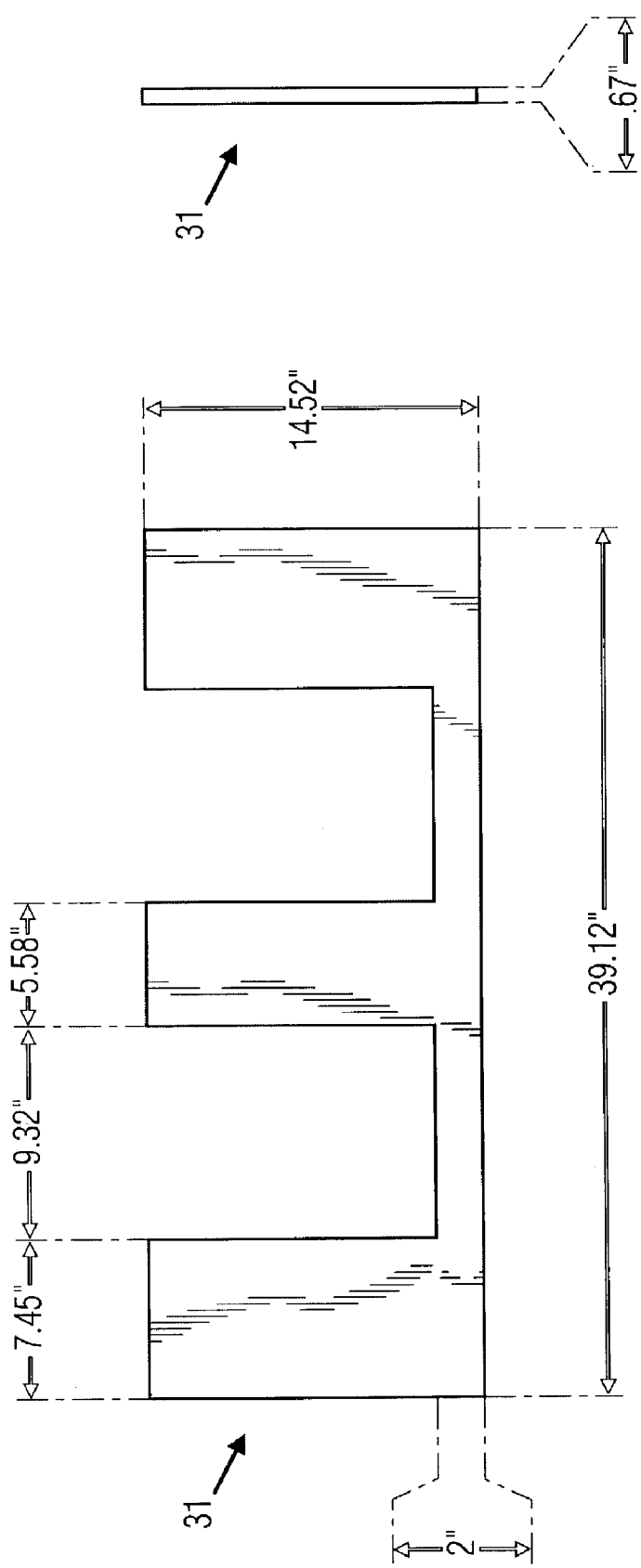

LARGE PACKAGE X-RAY APPARATUS AND METHOD

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to x-ray cassette holders and in particular to an x-ray cassette holder for holding multiple overlapping cassettes.

The use of x-rays by Explosive Ordnance Disposal (EOD) personnel is commonplace among our Armed Services. A primary purpose of using x-rays is to identify and detect explosive devices hidden in suspect packages. Eight inch by ten inch film cassettes are the standard and are readily available to EOD personnel. When large items, such as brief cases, large packages, boxes and metal drums are x-rayed, multiple cassettes are required.

The current method is to attach a multitude of these standard 8 inch by 10 inch film cassettes to a locally fabricated frame that will hold firmly more than one cassette in order to x-ray large packages. There is a need for a mechanical method to gang film cassettes in an easy, modular and functional fashion.

SUMMARY OF THE INVENTION

It is an object of the invention to provide a method and apparatus for holding a plurality of x-ray cassettes.

It is another object of the invention to provide a method and apparatus for holding a plurality of x-ray cassettes that is easy to assemble.

It is a further object of the invention to provide a method and apparatus for holding x-ray cassettes that positions multiple cassettes to eliminate or minimize any "dead spots" on the exposed film. That is, the cassettes are overlapped such that a continuous, complete x-ray image of the target is obtained. The cassettes are overlapped in a multiple layer repeating lateral and longitudinal pattern. This pattern may be repeated as many times as necessary to attain as large an exposure as required for the target.

One aspect of the invention is a method of obtaining an x-ray image of a target comprising providing multiple layers of x-ray cassettes wherein the x-ray cassettes in successive layers are positioned in partial overlapping relationship such that when the target and x-ray cassettes are exposed to x-rays, a continuous image of the target is obtained. In a preferred embodiment of the method, at least one layer of the x-ray cassettes includes more than one x-ray cassette.

Another aspect of the invention is a method of obtaining an x-ray image of a target comprising providing a bottom case; providing a first layer disposed in the bottom case, the first layer defining at least two x-ray cassette holding areas for holding and positioning at least two x-ray cassettes; providing a second layer disposed on the first layer, the second layer defining at least one x-ray cassette holding area for holding and positioning at least one x-ray cassette; providing a third layer disposed on the second layer, the third layer defining at least one x-ray cassette holding area for holding and positioning at least one x-ray cassette; providing a fourth layer disposed on the third layer, the fourth layer defining at least two x-ray cassette holding areas for holding and positioning at least two x-ray cassettes; providing a top case that fits over the bottom case; wherein the x-ray cassette holding areas in successive layers are positioned in partial overlapping relationship such that when x-ray cassettes are placed in the x-ray cassette holding areas and exposed to x-rays, a continuous image of the target is obtained.

In one embodiment of the method, the first layer defines at least six x-ray cassette holding areas for holding and positioning at least six x-ray cassettes; the second layer defines at least four x-ray cassette holding area for holding and positioning at least four x-ray cassettes; the third layer defines at least two x-ray cassette holding area for holding and positioning at least two x-ray cassettes; and the fourth layer defines at least three x-ray cassette holding areas for holding and positioning at least three x-ray cassettes.

The method further comprises placing x-ray cassettes in each of the x-ray cassette holding areas. Preferably, although not necessarily, the x-ray cassettes are standard eight inch by ten inch cassettes. The method additionally comprises exposing the target and the x-ray cassettes to x-rays to thereby obtain a continuous x-ray image of the target.

Yet another aspect of the invention is an apparatus for holding multiple x-ray cassettes for imaging a target comprising multiple layers of x-ray cassettes wherein the x-ray cassettes in successive layers are positioned in partial overlapping relationship such that when the target and x-ray cassettes are exposed to x-rays, a continuous image of the target is obtained. In a preferred embodiment, at least one of the multiple layers of x-ray cassettes includes more than one cassette.

Still another aspect of the invention is an apparatus for holding multiple x-ray cassettes for imaging a target comprising a bottom case; a first layer disposed in the bottom case, the first layer defining at least two x-ray cassette holding areas for holding and positioning at least two x-ray cassettes; a second layer disposed on the first layer, the second layer defining at least one x-ray cassette holding area for holding and positioning at least one x-ray cassette; a third layer disposed on the second layer, the third layer defining at least one x-ray cassette holding area for holding and positioning at least one x-ray cassette; a fourth layer disposed on the third layer, the fourth layer defining at least two x-ray cassette holding areas for holding and positioning at least two x-ray cassettes; a top case that fits over the bottom case; wherein the x-ray cassette holding areas in successive layers are positioned in partial overlapping relationship such that when x-ray cassettes are placed in the x-ray cassette holding areas and exposed to x-rays, a continuous image of the target is obtained.

One embodiment of the invention is an apparatus for holding multiple x-ray cassettes for imaging a target comprising a bottom case; a first layer comprising a first insert disposed in the bottom case, the first insert defining at least six x-ray cassette holding areas for holding and positioning at least six x-ray cassettes; a second layer comprising a second insert disposed on the first layer, the second insert defining at least four x-ray cassette holding areas for holding and positioning at least four x-ray cassettes; a third layer comprising an third insert disposed on the second layer, the third insert defining at least two x-ray cassette holding areas for holding and positioning at least two x-ray cassettes; a picture frame insert disposed on the third layer, the picture frame insert and the third insert defining at least three x-ray cassette holding areas for holding and positioning at least three x-ray cassettes; and a top case that fits over the bottom case; wherein the x-ray cassette holding areas are positioned in partial overlapping relationship in the first, second, third and picture frame inserts such that when x-ray cassettes are placed in the x-ray cassette holding areas and exposed to x-rays, a continuous image of the target is obtained.

In a preferred embodiment of the apparatus, the first insert, second insert, third insert and picture frame insert comprise foam. The apparatus further comprises x-ray cassettes placed in the x-ray cassette holding areas. In one embodiment, the x-ray cassettes comprise standard eight inch by ten inch cassettes having external dimensions of about 12.52 inches by 9.32 inches and the x-ray cassette holding areas are about 12.52 inches by 9.32 inches.

Preferably, the first insert is bonded to the bottom case. In an embodiment of the apparatus, the foam in the x-ray cassette holding areas is marked by nonmetallic numerals and the x-ray cassettes are marked by numerals corresponding to the x-ray cassette holding areas, the numerals comprising lead. The lead numerals may also be bonded to representative locations within any layer of foam or attached to the top or bottom of the case. The location of each lead numeral must be within the projected intensifier area of its respective cassette.

Further objects, features, and advantages of the invention will become more apparent from the following description of a preferred embodiment, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 4A is a plan view of the first insert, FIG. 4B is an end view of the first insert and FIG. 4C is a side view of the first insert.

FIG. 5A is a plan view and FIG. 5B is a side view of one half of the second insert.

DETAILED DESCRIPTION OF A PREFERRED EMBODIMENT

The following detailed description of a preferred embodiment of the invention relates to an apparatus for holding multiple x-ray cassettes for x-ray imaging a target. The described embodiment holds up to fifteen x-ray cassettes. However, it should be understood that fewer than fifteen or more than fifteen cassettes may be used in an apparatus according to the invention. The following description of a preferred embodiment is by way of example only. Configurations of the apparatus using fewer or more than fifteen cassettes are included in the scope of the invention. The cassettes are overlapped in a multiple layer repeating lateral and longitudinal pattern. The pattern may be repeated as many times as necessary to attain as large an exposure as required for the target.

Figure 1:
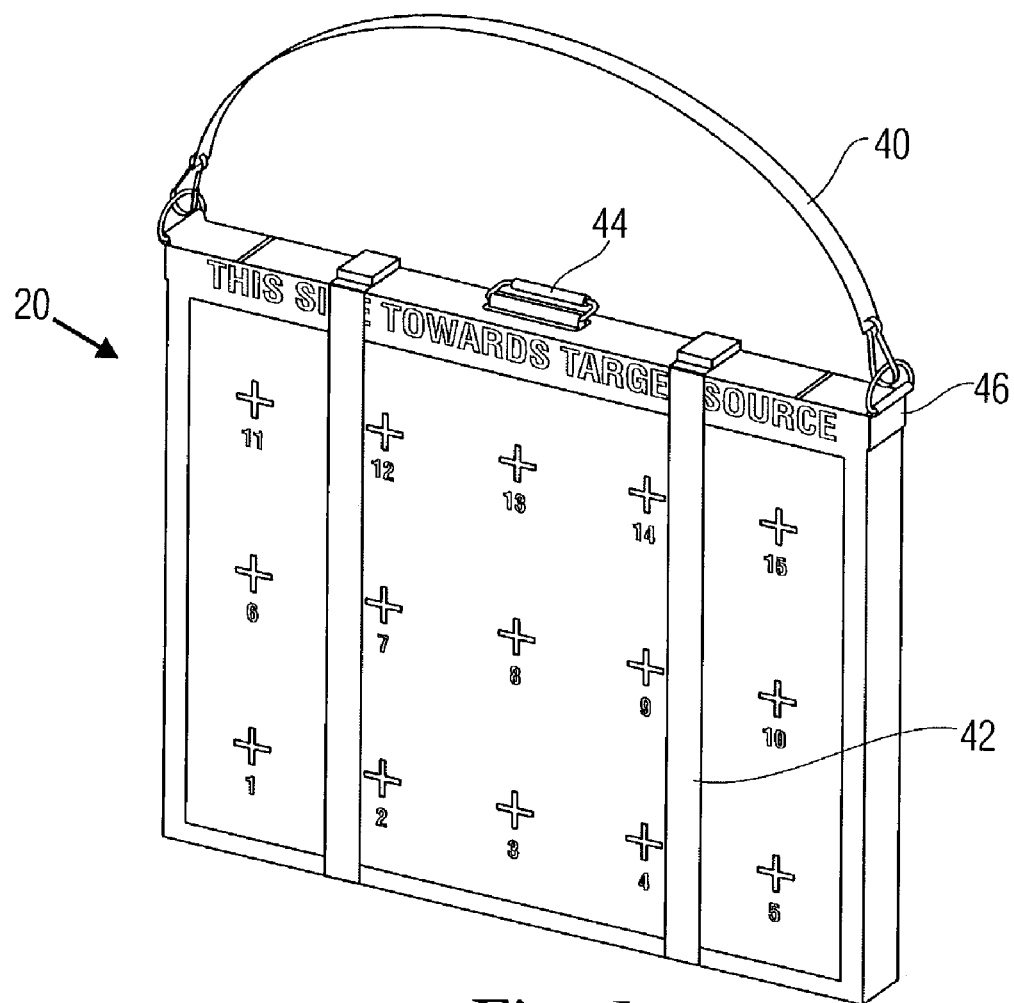
FIG. 1 is a perspective view of one embodiment of an apparatus according to the invention.
Figure 2:
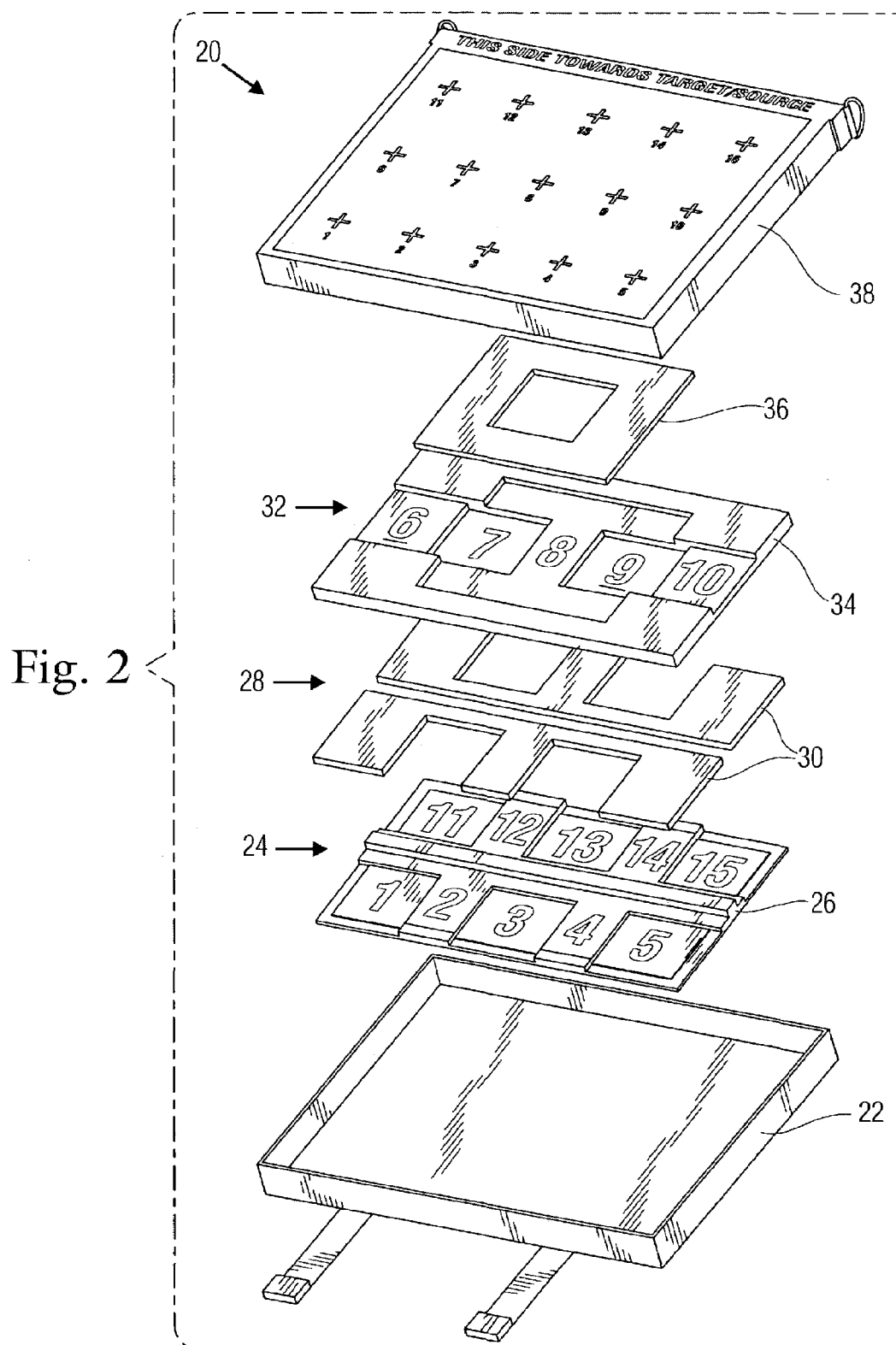
FIG. 2 is an exploded view of the embodiment of FIG. 1.

FIG. 1 is a perspective view of one embodiment of an apparatus 20 according to the invention. FIG. 2 is an exploded view of the apparatus 20 of FIG. 1. Referring to FIG. 2, apparatus 20 includes a bottom case 22. A first layer 24 comprising a first insert 26 is disposed in the bottom case 22. The first insert 26 defines six x-ray cassette holding areas 1,3,5,11,13,15 for holding and positioning up to six x-ray cassettes.

A second layer 28 comprises a second insert 30 disposed on the first layer 24. Second insert 30 may be a single piece or two pieces, as shown in FIG. 2. The second insert 30 defines four x-ray cassette holding areas 2,4,12,14 for holding and positioning up to four x-ray cassettes. An third layer 32 comprises an third insert 34 disposed on the second layer 28. The third insert 34 defines two x-ray cassette holding areas 7,9 for holding and positioning up to two x-ray cassettes. A picture frame insert 36 is disposed on the third layer 32. The picture frame insert 36 and the third insert 34 define three x-ray cassette holding areas 6,8,10 for holding and positioning up to three x-ray cassettes. A top case 38 fits over the bottom case 22.

Figure 3:
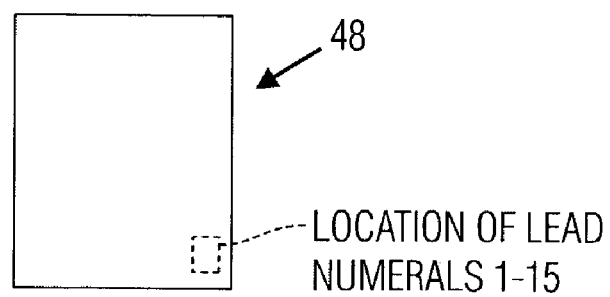
FIG. 3 is a front view of a typical 8 inch by 10 inch x-ray cassette.

The x-ray cassette holding areas 1–15 are positioned in overlapping relationship in the first, second, third and picture frame inserts 26,30,34,36 such that when x-ray cassettes are placed in the x-ray cassette holding areas 1–15 and exposed to x-rays, a continuous image of the target is obtained. The x-ray cassettes holding areas 1–15 are sized to hold standard eight inch by ten inch cassettes. FIG. 3 is a front view of a typical 8 inch by 10 inch x-ray cassette 48. X-ray cassette 48 has external dimensions of about 12.52 inches by 9.32 inches. Thus, the size of the holding areas 1–15 is also about 12.52 inches by 9.32 inches. X-ray cassette 48 will have a nominal film area of 8 inches by 10 inches.

The x-ray cassettes 48 are marked with lead numerals one through fifteen, corresponding to the fifteen x-ray cassette holding areas. When the film in each cassette 48 is developed, the lead numeral will show up on the film, thereby allowing the multiple films to be assembled properly to represent a continuous image of the target. The lead numerals may also be bonded to representative locations within any layer of foam or attached to the top or bottom of the case. The location of each lead numeral must be within the projected intensifier area of its respective cassette.

The top and bottom cases 38,22 are preferably a charcoal or flat black color and are made of 0.10 inch thick polyethylene or equivalent. The target/source perimeter area 50 is painted white on the top case 38 to provide maximum contrast to the charcoal or flat black color background of the case. The bottom case 22 fits within the top case 38. Referring to FIG. 1, apparatus 20 includes a shoulder strap 40 attached to the top case 38 with hardware 46. A center handle 44 is also provided. Fastener straps 42 keep the top and bottom cases together. Straps 42, made of nylon or another non-metallic material, are attached to the bottom case 22.

The first insert 26, second insert 30, third insert 34 and picture frame insert 36 are preferably made of foam. The foam material is, for example, a closed cell polyethylene structure with a density of about four pounds per cubic foot. The first insert 26 is preferably bonded to the bottom case 22.

FIG. 4A is a plan view of the first insert 26, FIG. 4B is an end view of the first insert 26 and FIG. 4C is a side view of the first insert 26. FIGS. 4A, 4B and 4C show preferred dimensions for the first insert 26. The nominal usable area of the apparatus 20 is shown in FIG. 4A as the target/source perimeter area 50, having dimensions of 37.25 inches by 28.35 inches. This target/source perimeter area 50 is marked on case 38 with a non-metallic marking. The holding areas 1–5 and 11–15 are marked on first insert 26 by nonmetallic numerals one through fifteen. FIG. 5A is a plan view and FIG. 5B is a side view of an E-shaped insert 31 that comprises one half of the second insert 30. Two of the E-shaped inserts 31 are used for the second insert 30. FIGS. 5A and 5B show preferred dimensions for the E-shaped inserts 31.

Figure 6:
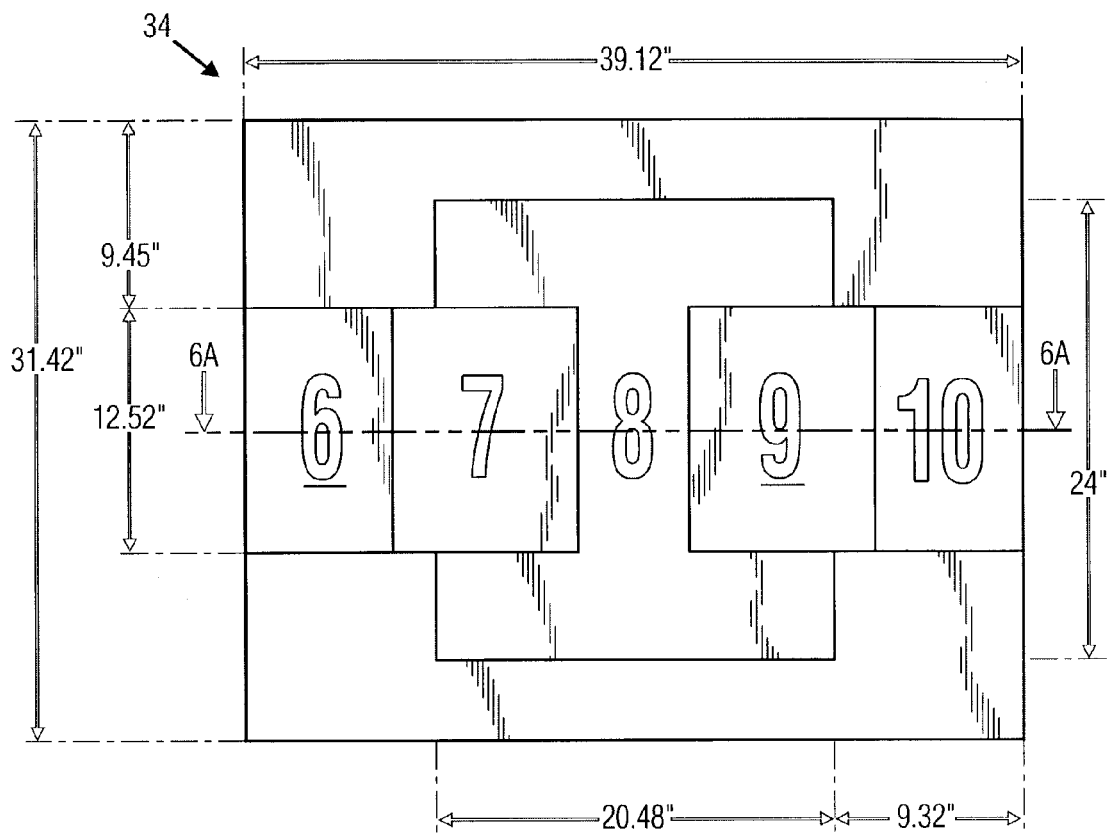
FIG. 6 is a plan view of the third insert and FIG. 6A is a section view of the third insert taken along the line A—A in FIG. 6.
Figure 6A:
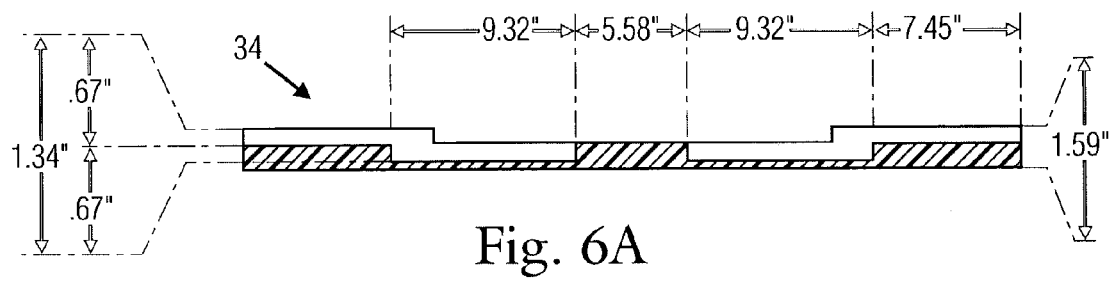
Figures 7A, 7B:
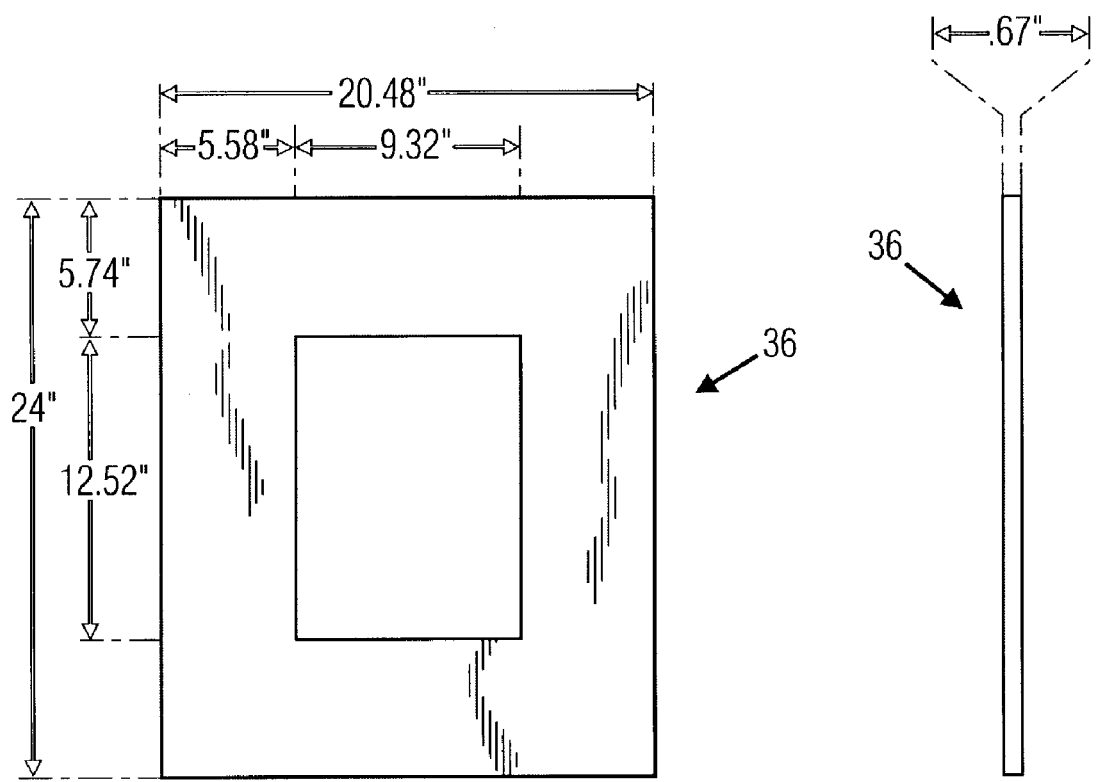
FIG. 7A is a plan view of the picture frame insert and FIG. 7B is a side view of the picture frame insert.

FIG. 6 is a plan view of the third insert 34 and FIG. 6A is a section view of the third insert 34 taken along the line A—A in FIG. 6. FIGS. 6 and 6A show the preferred dimensions for the third insert 34. The holding areas 6–10 are marked on third insert 34 by nonmetallic numerals six through ten. FIG. 7A is a plan view of the picture frame insert 36 and FIG. 7B is a side view of the picture frame insert 36. FIGS. 7A and 7B show the preferred dimensions for the picture frame insert 36.

The overlap (i.e., area outside of the intensifier target area on a cassette) of the x-ray cassettes 48 has very little effect on the x-ray image quality because the plastic area surrounding the film area is not dense enough to prevent x-ray penetration. Only the spacing of the cassettes 48 determines the ability to develop one large image. The proper overlapping of the x-rays cassettes 48 allows the developed images to be reassembled into one large x-ray picture.

Instructions for Use

Step 1: Place apparatus 20 on a flat surface in front of you. Orient the apparatus 20 so that the carrying handle 44 is away from you and the logo "This side towards target/source" (See FIG. 1) is facing you.

Step 2: Undo the snap clips, which connect the two straps 42 that encircle the case.

Step 3: Remove the top case 38 and place beside you.

Step 4: Remove the picture frame insert 36 and the third insert 34.

Step 5: Remove the two "E" shaped inserts 31.

Note: Attach lead numerals 1 through 15 to each x-ray cassette 48 prior to loading by using, for example, tape. The lead numerals should be placed within the black outlined aluminum intensifier area of each cassette. This assumes that you are loading 15 cassettes for a full x-ray view. Adjustments can be made to use less than the full load of 15 cassettes to match the target area to the desired view area.

Step 6: Insert x-ray cassettes Nos. 1 and 3 (as identified by the lead numerals) into the first insert holding areas 1 and 3, respectively. The aluminum intensifier on the x-ray cassettes should be facing you and the blue stripe of the cassette facing away from you.

Step 7: Repeat Step 6 for the loading of cassettes 5, 11, 13 and 15. Ensure that the lead numbers on the cassettes match the foam numbering sequence.

Step 8: Reinstall the two E shaped inserts 31 that comprise the second insert 30 back into their original position.

Step 9: Repeat Step 6 for the loading of cassettes 2, 4, 12, and 14. Ensure that the lead numbers on the cassettes match the foam numbering sequence.

Step 10: Reinstall the third insert 34 over the second layer 28 being careful that the numbering sequence is upright and facing in the same direction as the other numbers underneath.

Step 11: Repeat Step 6 for the loading of cassettes 7 and 9. Ensure that the lead numbers on the cassettes match the foam numbering sequence.

Step 12: Reinstall the picture frame insert 36 on the third layer 32.

Step 13: Repeat Step 6 for the loading of cassettes 6, 8, and 10. Ensure that the lead numbers on the cassettes match the foam numbering sequence.

Step 14: Reinstall the top case 38 over the bottom case 22. Make sure the center handle 44 is away from you and the logo "This side towards target/source" is facing you.

Step 15: Reattach the snap clips on the fastener straps 42 and slide them to the top of the apparatus 20 keeping them located away from the x-ray viewing area.

Step 16: Place the apparatus 20 in the proper position behind the target and in front of the source.

Step 17: After use, repeat all of the above steps to access the exposed film and cassettes and return the apparatus 20 to its original stored and locked position.

Step 18: Fasten together, for example, by taping, the developed film from each cassette 48 in its respective position from the apparatus 20 to obtain a continuous image of the target.

During testing, it was determined that the density of the target, the intensity of the x-ray source and the number of pulses were the determining factors related to the quality of the x-ray exposure. An exemplary x-ray source is an MK-32. The denser the target, the greater the power source requirements and the higher the number of pulses required. Also, the material of the case 22,38 did not cause any degradation to the exposures. The internal numbering of the cassette holding positions allow the exposures to be reassembled into one large exposure. The overlap of the cassettes was determined to be proper and no void areas were discovered when the developed images were reassembled into one large x-ray picture.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of obtaining an x-ray image of a target, comprising:

providing multiple layers of x-ray cassettes, wherein the x-ray cassettes in successive layers are positioned in partial overlapping relationship such that when the target and x-ray cassettes are exposed to x-rays, a continuous image of the target is obtained, wherein said multiple layers comprise a multiple layer simultaneously repeating lateral and longitudinal pattern, wherein said multiple layers comprise a first layer disposed substantially adjacent to a bottom case, said first layer comprises two non-contiguous rows, said two non-contiguous rows comprise a plurality of holding areas, and wherein said two non-contiguous rows are separated by a first insert, said first insert is in direct contact with said two non-contiguous rows.

2. The method of claim 1, wherein at least one of the multiple layers of x-ray cassettes includes more than one x-ray cassette.

3. The method according to claim 1, wherein said multiple layer simultaneously repeating lateral and longitudinal pattern comprises at least three rows of holding areas.

4. The method according to claim 1, wherein said two non-contiguous rows comprises a first row and a second row, said first row comprises three x-ray cassette holding areas, and said second row comprises three x-ray cassette-holding areas.

5. The method according to claim 1, wherein said first layer comprises holding areas.

6. A method of obtaining an x-ray image of a target, comprising:
   providing a bottom case;
   providing a first layer disposed in the bottom case, the first layer defining at least two x-ray cassette holding areas for holding and positioning at least two x-ray cassettes;
   providing a second layer disposed on the first layer, the second layer defining at least one x-ray cassette holding area for holding and positioning at least one x-ray cassette;
   providing a third layer disposed on the second layer, the third layer defining at least one x-ray cassette holding area for holding and positioning at least one x-ray cassette;
   providing a fourth layer disposed on the third layer, the fourth layer defining at least two x-ray cassette holding areas for holding and positioning at least two x-ray cassettes; and
   providing a top case that fits over the bottom case,
      wherein x-ray cassette holding areas in multiple layers comprise successive layers positioned in partial overlapping relationship such that when x-ray cassettes are placed in x-ray cassette holding areas and exposed to x-rays, a continuous image of the target is obtained,
      wherein said first layer comprises two non-contiguous rows, said two non-contiguous rows comprise said at least two x-ray cassette holding areas of said first layer, and
      wherein said two non-contiguous rows are separated by a first insert, said first insert is in direct contact with said two non-contiguous rows.

7. The method of claim 6, wherein the first layer defines at least six x-ray cassette holding areas for holding and positioning at least six x-ray cassettes; the second layer defines at least four x-ray cassette holding areas for holding and positioning at least four x-ray cassettes; the third layer defines at least two x-ray cassette holding areas for holding and positioning at least two x-ray cassettes; and the fourth layer defines at least three x-ray cassette holding areas for holding and positioning at least three x-ray cassettes.

8. The method of claim 6, further comprising:
   placing x-ray cassettes in each x-ray cassette holding areas.

9. The method of claim 8, wherein x-ray cassettes are standard eight inch by ten inch cassettes.

10. The method of claim 8, further comprising:
    exposing the target and x-ray cassettes to x-rays to thereby obtain a continuous x-ray image of the target.

11. An apparatus for holding multiple x-ray cassettes for imaging a target, comprising:
    multiple layers of x-ray cassettes,
       wherein the x-ray cassettes in successive layers are positioned in partial overlapping relationship such that when the target and x-ray cassettes are exposed to x-rays, a continuous image of the target is obtained,
       wherein said multiple layers comprise a multiple layer simultaneously repeating lateral and longitudinal pattern,
       wherein said multiple layers comprise a first layer disposed substantially adjacent to a bottom case, said first layer comprises two non-contiguous rows, said two non-contiguous rows comprise a plurality of holding areas, and
       wherein said two non-contiguous rows are separated by a first insert, said first insert is in direct contact with said two non-contiguous rows.

12. The apparatus of claim 11, wherein the x-ray cassettes comprise standard eight inch by ten inch cassettes comprising external dimensions of about 12.52 inches by 9.32 inches.

13. The apparatus of claim 11 wherein the holding areas are about 12.52 inches by 9.32 inches.

14. The apparatus of claim 11, wherein the first insert is bonded to the bottom case.

15. The apparatus of claim 11, wherein at least one of the multiple layers of x-ray cassettes includes more than one x-ray cassette.

16. The apparatus according to claim 11, wherein said multiple layer simultaneously repeating lateral and longitudinal pattern comprises a third row situated intermediate said two non-contiguous rows, said third row comprises a plurality of holding areas.

17. The apparatus according to claim 11, wherein said multiple layer simultaneously repeating lateral and longitudinal pattern is a repeated X-axis direction and a Y-axis direction pattern, said X-axis direction and Y-axis direction, respectively, point in a vertical direction and a horizontal direction, both said vertical direction and said horizontal direction are parallel to an image plane.

18. An apparatus for holding multiple x-ray cassettes for imaging a target, comprising:
    a bottom case;
    a first layer disposed in the bottom case, the first layer defining at least two x-ray cassette holding areas for holding and positioning at least two x-ray cassettes;
    a second layer disposed on the first layer, the second layer defining at least one x-ray cassette holding area for holding and positioning at least one x-ray cassette;
    a third layer disposed on the second layer, the third layer defining at least one x-ray cassette holding area for holding and positioning at least one x-ray cassette;
    a fourth layer disposed on the third layer, the fourth layer defining at least two x-ray cassette holding areas for holding and positioning at least two x-ray cassettes; and
    a top case that fits over the bottom case,
       wherein x-ray cassette holding areas in multiple layers comprise successive layers positioned in partial overlapping relationship such that when x-ray cassettes are placed in x-ray cassette holding areas and exposed to x-rays, a continuous image of the target is obtained,
       wherein said first layer comprises two non-contiguous rows, said two non-contiguous rows comprise said at least two x-ray cassette holding areas, and
       wherein said two non-contiguous rows are separated by a first insert, said first insert is in direct contact with said two non-contiguous rows.

19. The apparatus according to claim 18, wherein said first layer and said second layer comprise alternating columns of said x-ray cassette holding areas.

20. The apparatus according to claim 18, wherein said at least one X-ray cassette holding area of said third layer is situated in a middle of said third layer.

21. An apparatus for holding multiple x-ray cassettes for imaging a target, comprising:
    a bottom case;

a first layer comprising a first insert disposed in the bottom case, the first insert defining at least six x-ray cassette holding areas for holding and positioning at least six x-ray cassettes;

a second layer comprising a second insert disposed on the first layer, the second insert defining at least four x-ray cassette holding areas for holding and positioning at least four x-ray cassettes;

a third layer comprising an third insert disposed on the second layer, the third insert defining at least two x-ray cassette holding areas for holding and positioning at least two x-ray cassettes;

a picture frame insert disposed on the third layer, the picture frame insert and the third insert defining at least three x-ray cassette holding areas for holding and positioning at least three x-ray cassettes; and a top case that fits over the bottom case, wherein x-ray cassette holding areas are positioned in partial overlapping relationship in the first, second, third, and picture frame inserts such that when x-ray cassettes are placed in x-ray cassette holding areas and exposed to x-rays, a continuous image of the target is obtained.

22. The apparatus of claim 21, wherein the first insert, the second insert, the third insert, and the picture frame insert comprise foam.

23. The apparatus of claim 22, wherein the foam in x-ray cassette holding areas is marked by nonmetallic numerals.

24. The apparatus of claim 22, wherein the foam comprises closed cell polyethylene comprising a density of about four pounds per cubic foot.

25. The apparatus of claim 21, further comprising:
x-ray cassettes placed in x-ray cassette holding areas.

26. The apparatus of claim 25, wherein x-ray cassettes are marked by numerals corresponding to x-ray cassette holding areas, the numerals comprising lead.

27. The apparatus of claim 21, further comprising:
a central handle attached to the top case.

28. The apparatus of claim 21, further comprising:
a removable shoulder strap attached to the top case.

29. The apparatus of claim 21, further comprising:
fastener straps attached to the bottom case for holding the top and bottom cases together.

* * * * *